US012701330B2

(12) United States Patent
Chuang et al.

(10) Patent No.: US 12,701,330 B2
(45) Date of Patent: Aug. 4, 2026

(54) IMAGE CAPTURING APPARATUS AND MOBILE CLEANING ROBOT

(71) Applicant: eYs3D Microelectronics, Co., Taipei City (TW)

(72) Inventors: Shun-Ju Chuang, Taipei City (TW); Shi-Fan Chang, Taipei City (TW)

(73) Assignee: eYs3D Microelectronics, Co., Taipei City (TW)

( * ) Notice: Subject to any disclaimer, the term of this patent is extended or adjusted under 35 U.S.C. 154(b) by 458 days.

(21) Appl. No.: 18/316,239

(22) Filed: May 12, 2023

(65) Prior Publication Data

US 2023/0370729 A1        Nov. 16, 2023

Related U.S. Application Data

(60) Provisional application No. 63/342,167, filed on May 16, 2022.

(51) Int. Cl.
| | |
|---|---|
| *H04N 23/75* | (2023.01) |
| *A47L 11/40* | (2006.01) |
| *H04N 23/73* | (2023.01) |
| *H04N 25/00* | (2023.01) |
| *H04N 25/78* | (2023.01) |
| *G02B 5/20* | (2006.01) |

(52) U.S. Cl.
CPC .......... *H04N 23/75* (2023.01); *A47L 11/4011* (2013.01); *H04N 23/73* (2023.01); *H04N 25/00* (2023.01); *H04N 25/78* (2023.01); *A47L 2201/04* (2013.01); *G02B 5/205* (2013.01)

(58) Field of Classification Search
None
See application file for complete search history.

(56) References Cited

U.S. PATENT DOCUMENTS

| | | | | |
|---|---|---|---|---|
| 6,726,103 B1 * | 4/2004 | Motta | .................... | H04N 25/68 |
| | | | | 235/487 |
| 10,598,936 B1 * | 3/2020 | Berkovich | ............. | H04N 25/77 |
| 11,481,918 B1 * | 10/2022 | Ebrahimi Afrouzi | ....................... | |
| | | | | A47L 11/4008 |
| 2009/0153718 A1 * | 6/2009 | Olmstead | ............... | H04N 23/74 |
| | | | | 235/462.11 |
| 2013/0215235 A1 * | 8/2013 | Russell | .................. | G03B 17/54 |
| | | | | 348/47 |

(Continued)

FOREIGN PATENT DOCUMENTS

| | | |
|---|---|---|
| CN | 110622085 | 12/2019 |
| CN | 113841034 | 12/2021 |

OTHER PUBLICATIONS

"Office Action of Taiwan Counterpart Application", issued on Feb. 29, 2024, p. 1-p. 9.

*Primary Examiner* — Daniel T Tekle
(74) *Attorney, Agent, or Firm* — JCIPRNET

(57) ABSTRACT

An image capturing apparatus and a mobile cleaning robot are provided. The image capturing apparatus includes a light emitter, an image sensor, and a filter. The light emitter is configured to emit an invisible light to a target. The image sensor includes a field of view (FOV) covering an area of the target from near to far and is configured to sense the invisible light reflected from the area of the target and generate an image of the area of the target. The filter is configured to filter the invisible light to transform the invisible light into a non-uniform invisible light.

17 Claims, 6 Drawing Sheets

(56)         References Cited

U.S. PATENT DOCUMENTS

| | | | |
|---|---|---|---|
| 2013/0331990 A1* | 12/2013 | Jeong | G05D 1/0238 |
| | | | 348/118 |
| 2015/0032260 A1* | 1/2015 | Yoon | G05D 1/6486 |
| | | | 700/257 |
| 2016/0306358 A1* | 10/2016 | Kang | G05D 1/0248 |
| 2016/0360124 A1* | 12/2016 | Shan | H04N 23/72 |
| 2020/0036877 A1* | 1/2020 | Van Der Sijde | H04N 23/11 |
| 2020/0387726 A1* | 12/2020 | Fan | G06V 10/143 |
| 2021/0402612 A1* | 12/2021 | Wang | G01S 17/88 |
| 2023/0259139 A1* | 8/2023 | Lin | G05D 1/648 |
| | | | 700/259 |
| 2023/0370729 A1* | 11/2023 | Chuang | H04N 23/74 |
| 2024/0119614 A1* | 4/2024 | Ebrahimi Afrouzi | |
| | | | A47L 11/4011 |

* cited by examiner

HFOV

VFOV

22

20 overexposure

24

30 light emitter — 32 image sensor — 34 filter — 36 image capturing apparatus

IMAGE CAPTURING APPARATUS AND MOBILE CLEANING ROBOT

CROSS-REFERENCE TO RELATED APPLICATION

This application claims the priority benefit of U.S. provisional application Ser. No. 63/342,167, filed on May 16, 2022. The entirety of the above-mentioned patent application is hereby incorporated by reference herein and made a part of this specification.

BACKGROUND

Technical Field

The disclosure relates to an image capturing apparatus, and particularly relates to an image capturing apparatus having a filter and a mobile cleaning robot including the image capturing apparatus.

Description of Related Art

For an image capturing apparatus adopting an active light source, when a target for photographing is near the active light source, a light emitted by the active light source still has a high intensity after being reflected by the target, and consequently an image captured by the image capturing apparatus is overexposed.

For example, FIG. 1 is a schematic diagram of a conventional image capturing apparatus photographing an image of a target, and FIG. 2 is the image of the target photographed by the conventional image capturing apparatus. Please refer to FIG. 1. The conventional image capturing apparatus uses an active light source 12 to emit a light onto a target 100 and uses a camera 14 to sense a light intensity of a light reflected from the target 100 to generate an image of the target 100. A field of view FOV of the camera 14 covers an area of the target 100 from near to far. That is, a horizontal field of view HFOV is fixed, and a vertical field of view VFOV is distinguished as from near to far. The image generated by the camera 14 is an image of an area of the target 100 from near to far within the field of view.

Please refer to FIG. 1 and FIG. 2 at the same time. Since the target 100 is near the active light source 12, after the light emitted by the active light source 12 is reflected by the target 100, an image 20 formed by the camera 14 has problems that an image of a far-end field of view 22 is dark, and an image of a near-end field of view 24 is overexposed, so that the image 20 cannot be used to identify an area of a near-end of the target 100.

SUMMARY

The disclosure provides an image capturing apparatus, through a filter filtering an invisible light emitted to a target or an invisible light received from the target, the problem of overexposure of near-end images can be solved.

The disclosure provides an image capturing apparatus, which includes a light emitter, an image sensor, and a filter. The light emitter is configured to emit an invisible light to a target. The image sensor includes a field of view (FOV) covering an area of the target from near to far and is configured to sense the invisible light reflected from the area of the target and generate an image of the area of the target. The filter is configured to filter the invisible light to transform the invisible light into a non-uniform invisible light.

The disclosure provides a mobile cleaning robot, which includes a body and an image capturing apparatus disposed in the body. The image capturing apparatus includes a light emitter, an image sensor, and a filter. The light emitter is configured to emit an invisible light to a target. The image sensor includes an FOV covering an area of the target from near to far and is configured to sense the invisible light reflected from the area of the target and generate an image of the area of the target. The filter is configured to filter the invisible light to transform the invisible light into a non-uniform invisible light.

In some embodiments, the filter filters the invisible light according to a change of a distance of an area of the image sensor and the target from near to far or according to a change of a brightness of an area of an image from near to far, so that the brightness of the area of the image generated by the image sensor becomes uniform.

In some embodiments, the filter adjusts a gradient transmission rate of the light emitter, so that the invisible light emitted by the light emitter is transformed into a non-uniform invisible light whose intensity changes in a gradient.

In some embodiments, the filter is a neutral density filter (ND filter) having a gradient transmission rate, which is configured on the optical path from the invisible light emitted by the light emitter to the target, so that the invisible light is transformed into a non-uniform invisible light whose intensity changes in a gradient.

In some embodiments, the filter is an ND filter having a gradient transmission rate, which is configured on the optical path from the invisible light reflected by the target to the image sensor, so that the invisible light is transformed into a non-uniform invisible light whose intensity changes in a gradient.

In some embodiments, the filter adjusts a gradient transmission rate of the image sensor, so that the invisible light sensed by the image sensor is transformed into a non-uniform invisible light whose intensity changes in a gradient.

In some embodiments, the filter controls an exposure time of respective pixel rows of multiple pixel rows of the image sensor through timing control, so that the multiple pixel rows have different sensitivities.

In some embodiments, the image sensor further includes an analog-to-digital converter (ADC) configured to convert a light intensity sensed by multiple pixels in the multiple pixel rows of the image sensor into pixel values, and the filter includes controlling the number of bits output by the ADC according to a reference voltage, so that the pixel values output by the ADC reflect the sensitivities of the respective pixel rows.

In some embodiments, the filter includes adjusting analog gains or digital gains of the respective pixel rows of the multiple pixel rows of the image sensor, so that the multiple pixel rows have different sensitivities.

In some embodiments, the filter is an ND filter having a gradient transmission rate, which is configured in a lens of the image sensor, so that the invisible light sensed by the image sensor is transformed into a non-uniform invisible light whose intensity changes in a gradient.

Based on the above, the image capturing apparatus of the disclosure adjusts the gradient transmission rate of the light emitter or the image sensor or configures a filter having a gradient transmission rate on an optical path from the light emitter to the target, from the target to the image sensor, or in the lens of the image sensor, so that the invisible light emitted to the target or received from the target is filtered, which can solve the problem of overexposure of the near-end image.

DESCRIPTION OF THE EMBODIMENTS

The embodiment of the disclosure is directed at configuring a filter on an image capturing apparatus having an active light source, and according to a change of a distance of an area of the image sensor of the image capturing apparatus and a target to be photographed from near to far or a change of a brightness of an area of a photographed image from near to far, adjust the gradient transmission rate of the light emitter or the image sensor, or configure a filter having a gradient transmission rate on an optical path from the light emitter to the target, from the target to the image sensor, or in a lens of the image sensor, for filtering the invisible light emitted to the target or received from the target to solve the problem of overexposure of the near-end image.

Figure 1:
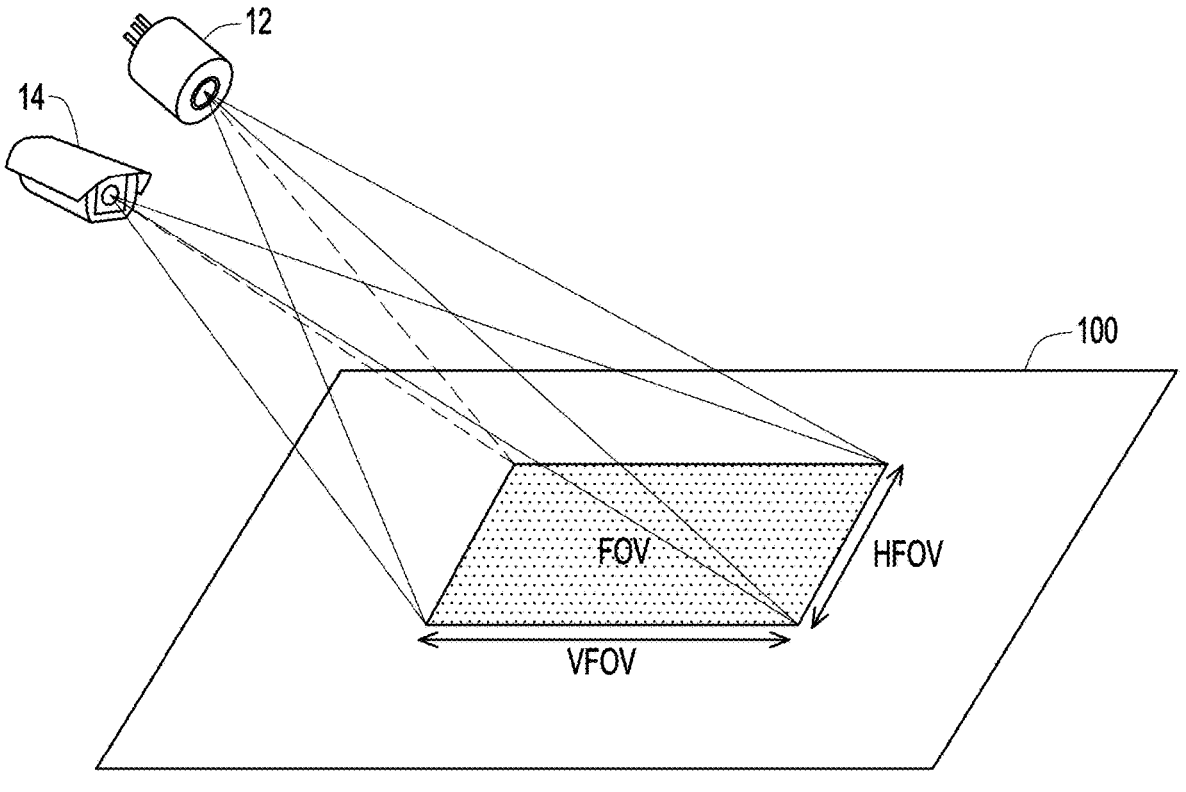
FIG. 1 is a schematic diagram of a conventional image capturing apparatus photographing an image of a target.
Figure 2:
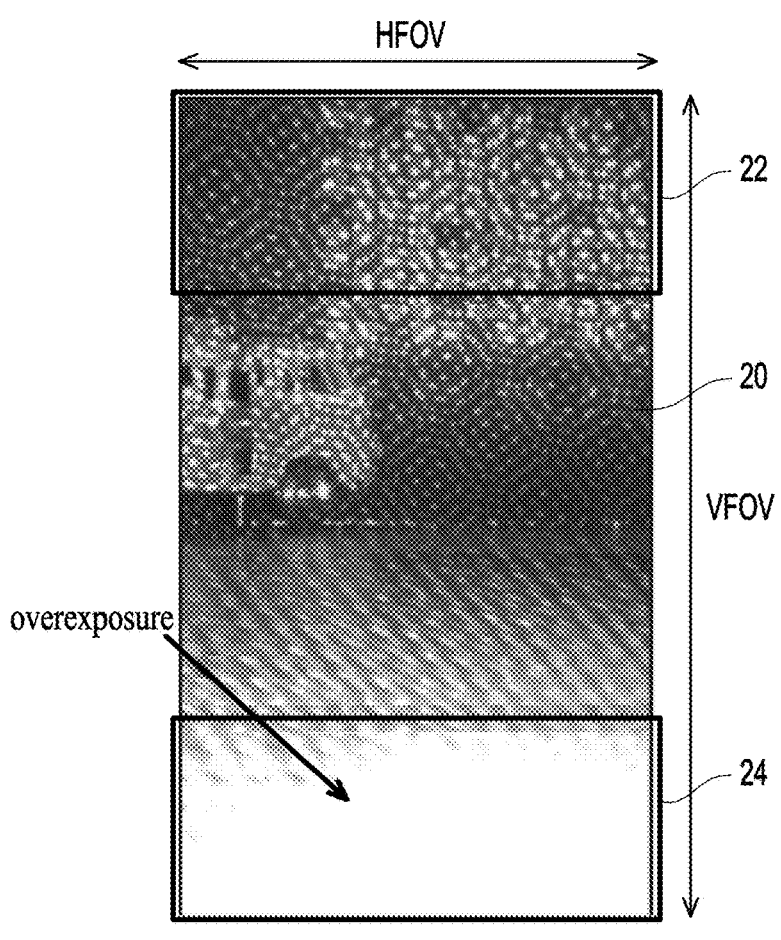
FIG. 2 is the image of the target photographed by the conventional image capturing apparatus.
Figure 3:
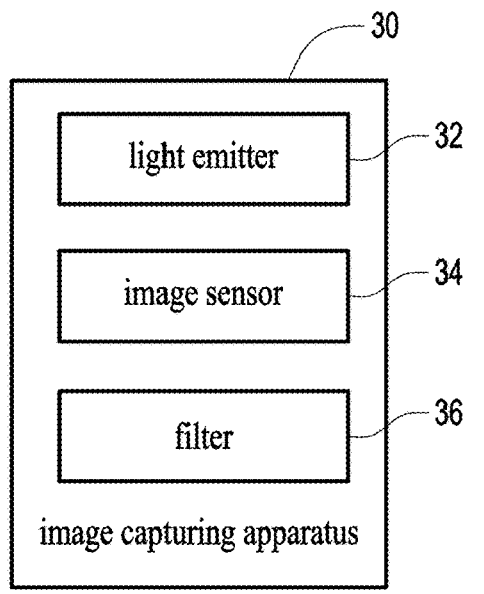
FIG. 3 is a block diagram illustrating an image capturing apparatus according to an embodiment of the disclosure.

FIG. 3 is a block diagram illustrating an image capturing apparatus according to an embodiment of the disclosure. Please refer to FIG. 3. An image capturing apparatus 30 of the embodiment is configured to photograph an image of a target, which includes a light emitter 32, an image sensor 34, and a filter 36, and functions thereof are described as the following.

The light emitter 32 is, for example, an infrared (IR) flood illuminator, an IR patterned projector, or an IR light source, configured to emit IRs to the target. In other embodiments, the light emitter 32 may also be configured to emit an invisible light whose wavelength is different from the IRs, such as ultraviolet rays or far IRs, and the disclosure is not limited thereto.

The image sensor 34 is configured with, for example, a charge coupled device (CCD), a complementary metal-oxide semiconductor (CMOS) component or other types of photosensitive components, in which, by adjusting a wavelength sensing range of the photosensitive component, the image sensor 34 may sense an intensity of an invisible light such as IRs reflected from the target to generate an image of the target. In some embodiments, the image capturing apparatus 30 further includes a lens disposed in front of the image sensor 34, which may change a size of a light entrance hole to adjust an amount of exposure of the image sensor 34.

The filter 36 is, for example, configured to adjust a gradient transmission rate of the light emitter 32 or the image sensor 34, so as to filter the invisible light emitted to an area of the target from near to far or to filer the invisible light received from the area of the target, so that the invisible light becomes a non-uniform invisible light, so that the brightness of the area of the image generated by the image sensor 34 becomes uniform.

Figure 4A:
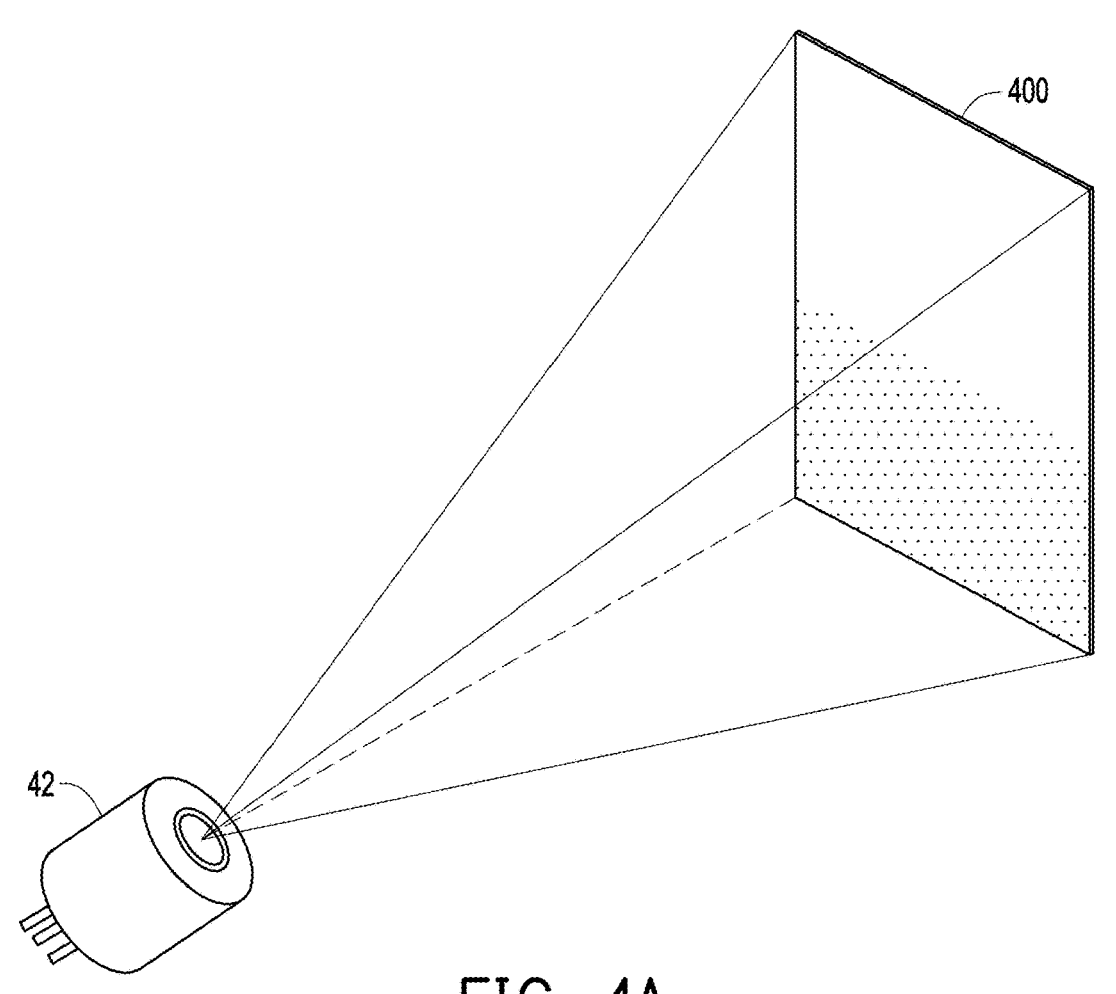
FIG. 4A is a schematic diagram illustrating a filter filtering an invisible light according to an embodiment of the disclosure.
Figure 4B:
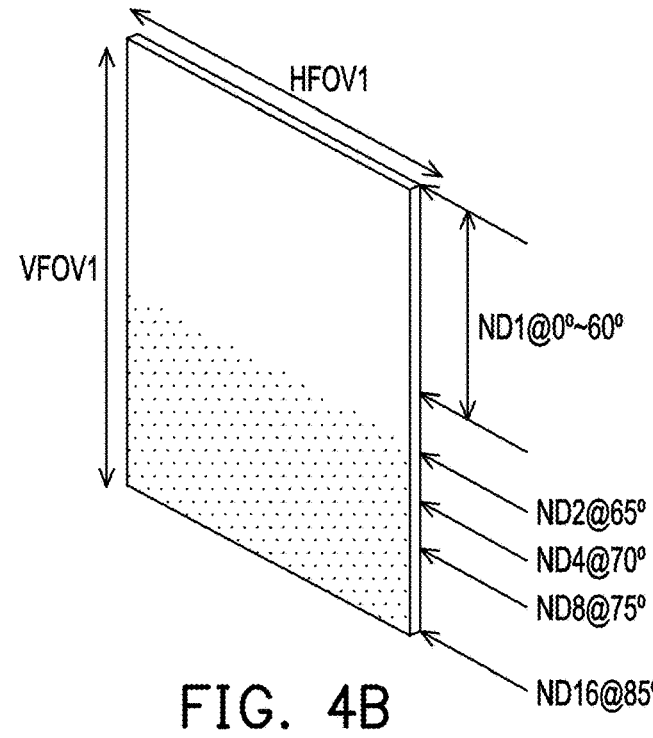
FIG. 4B is a schematic diagram illustrating a relationship between a camera angle and the filter according to an embodiment of the disclosure.

For example, FIG. 4A is a schematic diagram illustrating a filter filtering an invisible light according to an embodiment of the disclosure, and FIG. 4B is a schematic diagram illustrating a relationship between a camera angle and the filter according to an embodiment of the disclosure. Please refer to FIG. 4A. In this embodiment, a light emitter 42 emits an invisible light. The light emitter 42 adjusts the gradient transmission rate thereof through, for example, a built-in filter, so that the invisible light emitted by the light emitter 42 to a target 400 is transformed into a non-uniform invisible light whose intensity changes in a gradient (decreasing from top to bottom in the vertical direction).

Please refer to FIG. 4B. For an area covered by the FOV (HFOV1 for a horizontal FOV and VFOV1 for a vertical FOV) of the image sensor, a light transmittance of a filter used varies depending on a distance. An included angle (hereinafter referred to as the camera angle) between a camera direction and a horizontal line may represent the distance. That is, the smaller the camera angle, the light comes from a farther area; the larger the camera angle, the light comes from a nearer area.

As shown in FIG. 4B, for an area with a camera angle from 0° to 60°, a filter used is ND1, that is, a light transmittance has no attenuation; for an area with a camera angle of 65°, a filter used is ND2, that is, a light transmittance is half of the original; for an area with a camera angle of 70°, a filter used is ND4, that is, a light transmittance is a quarter of the original; for an area with a camera angle of 75°, a filter used is ND8, that is, a light transmittance is one eighth of the original; for an area with a camera angle of 85°, a filter used is ND16, that is, a light transmittance is one sixteenth of the original. In other words, through the filtering of the filter, the nearer the distance (the larger the camera angle), the more attenuated the intensity of the reflected light in the area, which can solve the problem of overexposure of a near-end image in an image generated by the image sensor.

Figure 5:
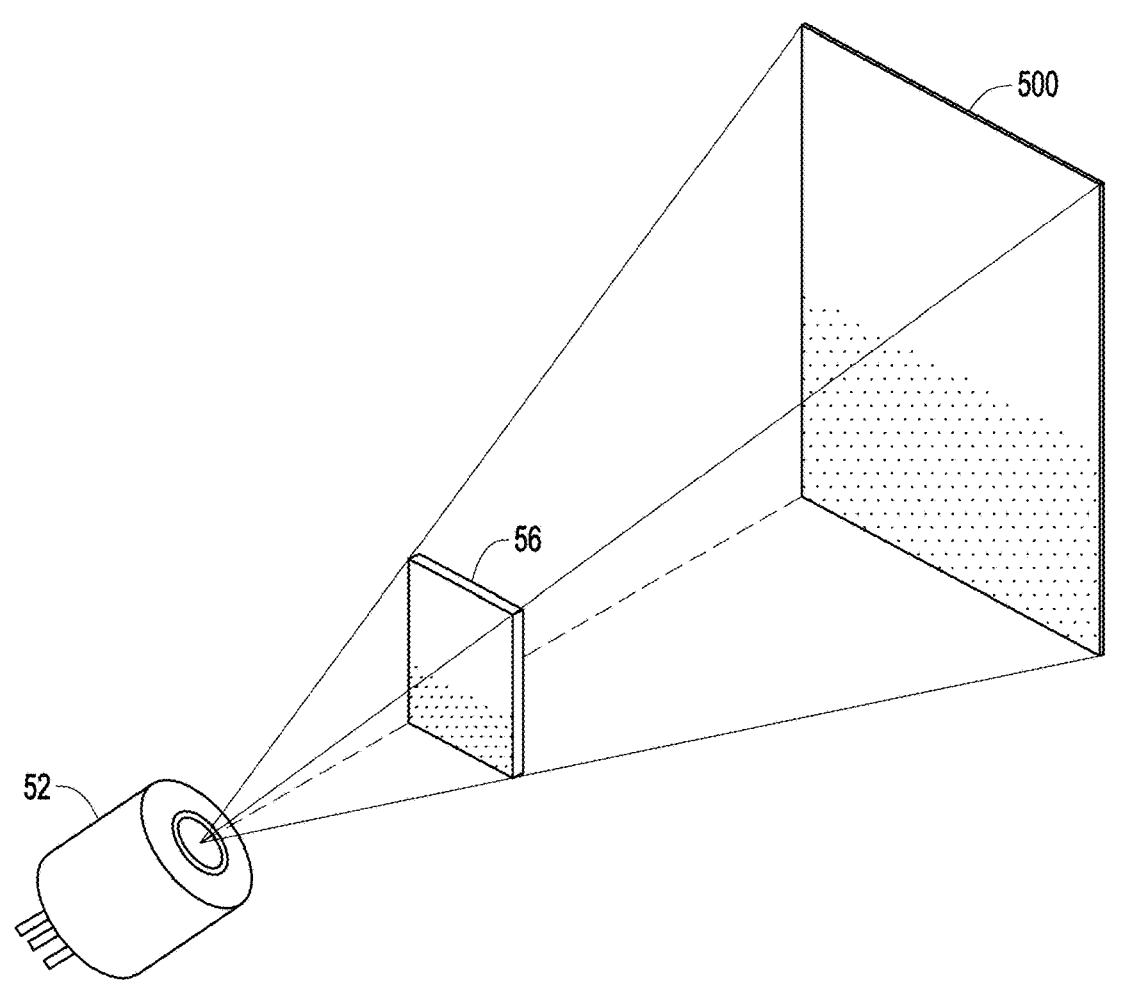
FIG. 5 is a schematic diagram illustrating the filter filtering the invisible light according to an embodiment of the disclosure.

FIG. 5 is a schematic diagram illustrating the filter filtering the invisible light according to an embodiment of the disclosure. Please refer to FIG. 5. The embodiment adopts a neutral density filter (ND filter) 56 having a gradient transmission rate as the filter, and is configured on the optical path from a light emitter 52 to a target 500, so that the invisible light emitted to the target 500 is transformed into a non-uniform invisible light whose intensity changes in a gradient (decreasing from top to bottom in the vertical direction). After the non-uniform invisible light is reflected by the target 500 and enters the image sensor (not shown), the brightness of the image generated by the image sensor becomes uniform.

Figure 6:
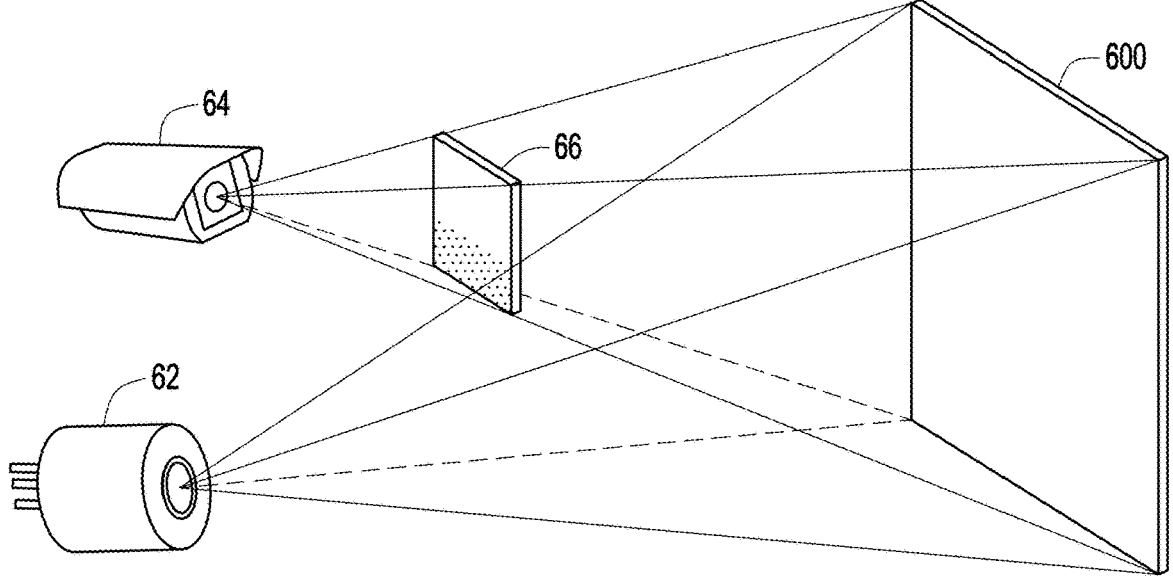
FIG. 6 is a schematic diagram illustrating the filter filtering the invisible light according to an embodiment of the disclosure.

FIG. 6 is a schematic diagram illustrating a filter filtering an invisible light according to an embodiment of the disclosure. Please refer to FIG. 6. The embodiment also adopts an ND filter 66 having a gradient transmission rate as the filter, and is configured on the optical path from a target 600 to an image sensor 64, so that the uniform invisible light emitted to the target 600 by a light emitter 62 is transformed into a non-uniform invisible light whose intensity changes in a gradient (decreasing from top to bottom in the vertical direction) after being reflected by the target 600 and filtered by the ND filter 66. After the non-uniform invisible light enters the image sensor 64, the brightness of the image generated by the image sensor 64 becomes uniform.

Figure 7:
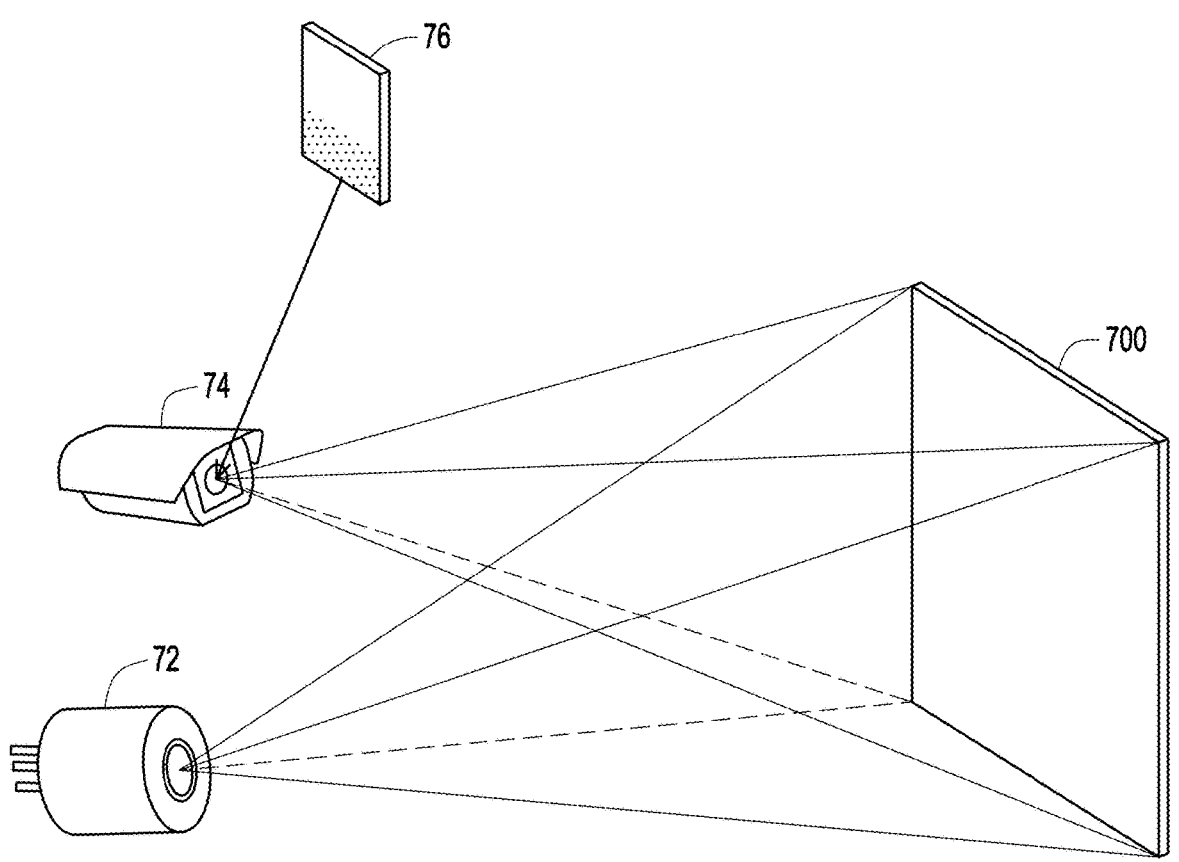
FIG. 7 is a schematic diagram illustrating the filter filtering the invisible light according to an embodiment of the disclosure.

FIG. 7 is a schematic diagram illustrating the filter filtering the invisible light according to an embodiment of the disclosure. Please refer to FIG. 7. In this embodiment, a filter 76 is disposed in an image sensor 74, so that the uniform invisible light emitted to a target 700 by a light emitter 72 is transformed into a non-uniform invisible light whose intensity changes in a gradient (decreasing from top to bottom in the vertical direction) after being reflected by the target 700 and filtered by the filter 76. The non-uniform invisible light makes the brightness of the image generated by the image sensor 74 uniform.

In some embodiments, the image sensor 74 is equipped with the filter 76 on the lens (not shown), so that the invisible light emitted by the light emitter 72 to the target 700 is transformed into a non-uniform invisible light whose intensity changes in a gradient (decreasing from top to bottom in the vertical direction) after being reflected by the target 700 and being filtered by the filter 76 in the lens. The filter 76 is, for example, an IR cut filter, but is not limited thereto.

In other embodiments, the image sensor 74 may adjust the gradient transmission rate thereof through the built-in filter 76, so that the invisible light sensed becomes a non-uniform invisible light whose intensity changes in a gradient.

For example, in some embodiments, the filter 76 may control the exposure time of each pixel row of multiple pixel rows of the image sensor 74 through timing control, so that the multiple pixel rows have different sensitivities, so as to adjust the light intensity of the invisible light sensed by the image sensor 74.

In some embodiments, the image sensor 74 includes an analog-to-digital converter (ADC) configured to convert the light intensity sensed by multiple pixels in the multiple pixel rows of the image sensor 74 to pixel values. The filter 76 may control the number of bits output by the analog-to-digital converter according to the reference voltage, so that the pixel values output by the analog-to-digital converter may reflect the sensitivities of the respective pixel rows.

In some embodiments, the filter 76 may adjust analog gains or digital gains of the respective pixel rows of the multiple pixel rows of the image sensor 74, that is, adjust the ISO of the pixels of each pixel row, so that the pixel rows have different sensitivities.

Figure 8:
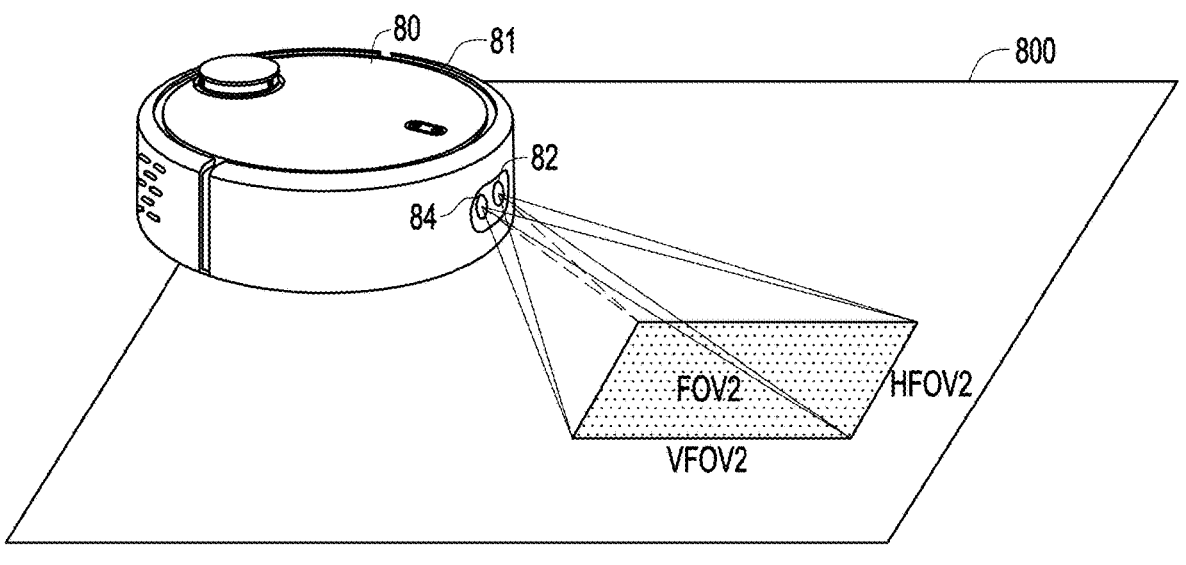
FIG. 8 illustrates an application example of the image capturing apparatus according to an embodiment of the disclosure.

FIG. 8 illustrates an application example of the image capturing apparatus according to an embodiment of the disclosure. Please refer to FIG. 8. In this embodiment, a light emitter 82 and an image sensor 84 are disposed on a body 81 of a mobile cleaning robot 80. The light emitter 82 emits the invisible light to a ground 800, and the image sensor 84 senses the invisible light reflected from the covered area from an FOV FOV2 (HFOV2 for a horizontal FOV, VFOV2 for a vertical FOV).

The invisible light emitted by the light emitter 82 is transformed into a non-uniform invisible light whose intensity changes in a gradient (decreasing from top to bottom in the VFOV2 direction) after passing through the filter of the above-mentioned embodiment, and the brightness of the near-end image may be weakened, so that the brightness of the image generated by the image sensor 84 becomes uniform, thereby solving the problem of overexposure of the near-end image. Thus, the mobile cleaning robot 80 can recognize the objects in the near-end image of the ground 800 without being affected by the distance.

Figure 9:
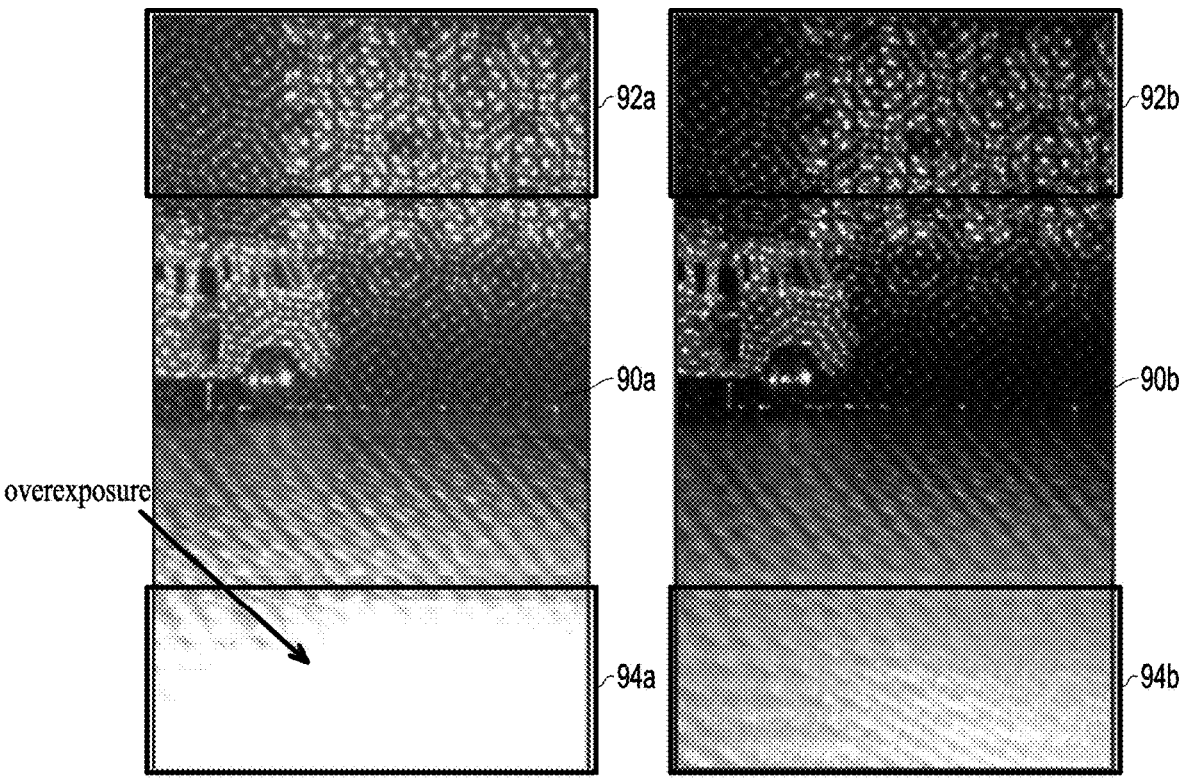
FIG. 9 illustrates a comparative example of images generated by the image capturing apparatus according to an embodiment of the disclosure.

FIG. 9 illustrates a comparative example of images generated by the image capturing apparatus according to an embodiment of the disclosure. Please refer to FIG. 8 and FIG. 9 at the same time. Images 90*a* and 90*b* are images of the ground 800 generated by the image sensor 84 on the mobile cleaning robot 80 sensing the invisible light reflected by the ground 800. In a situation that the invisible light emitted by the light emitter 82 is not filtered by the filter, a far-end image 92*a* is dark and a near-end image 94*a* is overexposed in the image 90*a*. And when the invisible light emitted by the light emitter 82 is filtered by the filter of the above embodiment, the brightness of a far-end image 92*b* and a near-end image 94*b* in the image 90*b* becomes uniform, and details of the ground 800 may be identified from the near-end image 94*b*.

It should be noted that, in addition to the application of the mobile cleaning robot, the image capturing apparatus of the embodiment of the disclosure may also be applied to an apparatus or a system that uses an active light source and the target for photographing is near the light source such as a surveillance camera, so that the problem of near-end image overexposure is solved.

In summary, the image capturing apparatus of the disclosure adjusts the gradient transmission rate of the light emitter or the image sensor or configures the filter having the gradient transmission rate on the optical path from the light emitter to the target, from the target to the image sensor, or in the lens of the image sensor, so that the invisible light emitted to the target or received from the target is filtered, which can solve the problem of overexposure of the near-end image.

What is claimed is:

1. An image capturing apparatus, comprising:
a light emitter emitting an invisible light to a target;
an image sensor having a field of view (FOV) covering an area of the target from near to far, sensing the invisible light reflected from the area of the target and generating an image of the area of the target; and
a filter filtering the invisible light to transform the invisible light into a non-uniform invisible light with intensity variation, wherein the filter adjusts a gradient transmission rate of the light emitter, so that the invisible light emitted by the light emitter is transformed into a non-uniform invisible light whose intensity changes in a gradient, and wherein a light transmittance of the filter used varies depending on a distance indicated by an included angle between a camera direction and a horizontal line.

2. The image capturing apparatus according to claim 1, wherein the filter filters the invisible light according to a change of a distance of an area of the image sensor and the target from near to far or according a change of a brightness of an area of an image from near to far, so that the brightness of the area of the image generated by the image sensor becomes uniform.

3. The image capturing apparatus according to claim 1, wherein the filter is a neutral density filter (ND filter) having a gradient transmission rate, which is configured on an optical path from the invisible light emitted by the light emitter to the target, so that the invisible light is transformed into a non-uniform invisible light whose intensity changes in a gradient.

4. The image capturing apparatus according to claim 1, wherein the filter is an ND filter having a gradient transmission rate, which is configured on an optical path from the invisible light reflected by the target to the image sensor, so that the invisible light is transformed into a non-uniform invisible light whose intensity changes in a gradient.

5. The image capturing apparatus according to claim 1, wherein the filter controls an exposure time of respective pixel rows of a plurality of pixel rows of the image sensor through timing control, so that the plurality of pixel rows have different sensitivities.

6. The image capturing apparatus according to claim 1, wherein the image sensor further comprises an analog-to-digital converter (ADC) configured to convert a light intensity sensed by a plurality of pixels in the plurality of pixel rows of the image sensor into pixel values, wherein the filter comprises controlling the number of bits output by the ADC according to a reference voltage, so that the pixel values output by the ADC reflect the sensitivities of the respective pixel rows.

7. The image capturing apparatus according to claim 1, wherein the filter comprises adjusting analog gains or digital gains of the respective pixel rows of the plurality of pixel rows of the image sensor, so that the plurality of pixel rows have different sensitivities.

8. The image capturing apparatus according to claim 1, wherein the filter is an ND filter having a gradient transmission rate, which is configured in a lens in front of the image sensor, so that the invisible light sensed by the image sensor is transformed into a non-uniform invisible light whose intensity changes in a gradient.

9. A mobile cleaning robot, comprising:

a body; and an image capturing apparatus configured in the body, comprising:

a light emitter emitting an invisible light to a target;

an image sensor having an FOV covering an area of a target from near to far, sensing the invisible light reflected from the area of the target and generating an image of the area of the target; and a filter filtering the invisible light to transform the invisible light into a non-uniform invisible light with intensity variation, wherein the filter adjusts a gradient transmission rate of the light emitter, so that the invisible light emitted by the light emitter is transformed into a non-uniform invisible light whose intensity changes in a gradient, and wherein a light transmittance of the filter used varies depending on a distance indicated by an included angle between a camera direction and a horizontal line.

10. The mobile cleaning robot according to claim 9, wherein the filter filters the invisible light according to a change of a distance of an area of the image sensor and the target from near to far or a change of a brightness of an area of an image from near to far, so that the brightness of the area of the image generated by the image sensor becomes uniform.

11. The mobile cleaning robot according to claim 9, wherein the filter is an ND filter having a gradient transmission rate, which is configured on an optical path from the invisible light emitted by the light emitter to the target, so that the invisible light is transformed into a non-uniform invisible light whose intensity changes in a gradient.

12. The mobile cleaning robot according to claim 9, wherein the filter is an ND filter having a gradient transmission rate, which is configured on an optical path from the invisible light reflected by the target to the image sensor, so that the invisible light is transformed into a non-uniform invisible light whose intensity changes in a gradient.

13. The mobile cleaning robot according to claim 9, wherein the filter adjusts the gradient transmission rate of the image sensor, so that the invisible light sensed by the image sensor is transformed into a non-uniform invisible light whose intensity changes in a gradient.

14. The mobile cleaning robot according to claim 13, wherein the filter controls an exposure time of respective pixel rows of a plurality of pixel rows of the image sensor through timing control, so that the plurality of pixel rows have different sensitivities.

15. The mobile cleaning robot according to claim 13, wherein the image sensor further comprises an ADC configured to convert a light intensity sensed by a plurality of pixels in the plurality of pixel rows of the image sensor into pixel values, wherein the filter comprises controlling the number of bits output by the ADC according to a reference voltage, so that the pixel values output by the ADC reflect the sensitivities of the respective pixel rows.

16. The mobile cleaning robot according to claim 13, wherein the filter comprises adjusting analog gains or digital gains of the respective pixel rows of the plurality of pixel rows of the image sensor, so that the plurality of pixel rows have different sensitivities.

17. The mobile cleaning robot according to claim 9, wherein the filter is an ND filter having a gradient transmission rate, which is configured in a lens in front of the image sensor, so that the invisible light sensed by the image sensor is transformed into a non-uniform invisible light whose intensity changes in a gradient.

* * * * *